Figure 1:
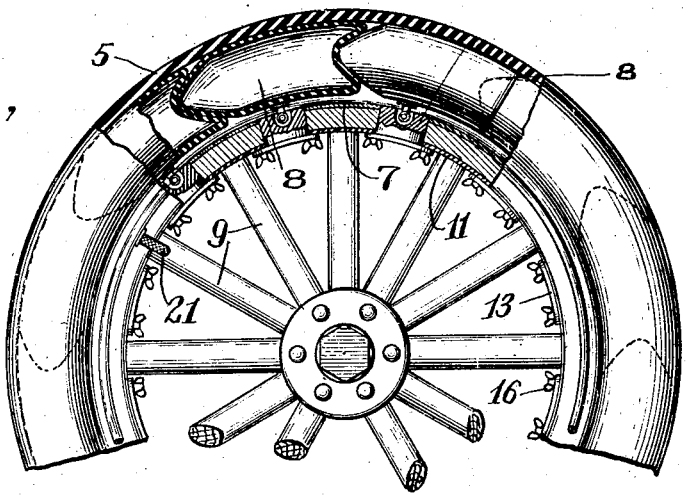

J. A. RABBITT.
TIRE.
APPLICATION FILED SEPT. 20, 1913.

1,138,246.

Patented May 4, 1915.

WITNESSES
J. McIntosh
J. F. Collin.

INVENTOR
James A. Rabbitt
BY
Edmunds & Edmunds
ATTORNEYS

UNITED STATES PATENT OFFICE.

JAMES A. RABBITT, OF YOKOHAMA, JAPAN.

TIRE.

1,138,246. Specification of Letters Patent. Patented May 4, 1915.

Application filed September 20, 1913. Serial No. 790,923.

*To all whom it may concern:*

Be it known that I, JAMES A. RABBITT, a citizen of the United States residing at Yokohama, in the Empire of Japan, have invented certain new and useful Improvements in Tires, of which the following is a specification.

This invention relates to inflatable tires of the type now commonly employed on the wheels of vehicles and particularly self-propelled vehicles.

The invention is directed to the provision of a tire of an improved construction, the improvements being of special value in reducing the work incident to repairing the tire after a puncture and in reducing the weight of the spare parts to be carried by eliminating the necessity of carrying spare wheels and other parts of relatively great weight and bulk.

The invention involves the provision of a tire consisting of a shoe and a plurality of disconnected inflatable inner-tube sections within the shoe, in combination with a rim on which the tire is mounted and which is provided with a plurality of openings therein through which the inner-tube sections may be passed to insert them in the shoe. The inner-tube sections are in the form of expansible bulbs of any suitable shape and are arranged to be inflated with air so as to support the tread of the shoe resiliently. Suitable connections are made to these bulbs to permit of inflating them and preferably these connections all lead to a tube extending around the rim so that all of the inner-tube sections may be simultaneously inflated through one valve connection to the tube. Preferably each inner-tube section is of such size that when inflated it extends around the rim a distance equal to the distance between the spokes and one opening for the insertion of an inner-tube section is provided in the rim between each pair of adjacent spokes. A detachable closure is provided for each of these openings, this closure being so shaped that it will properly support the portion of the inner-tube section which directly overlies it.

With a tire constructed as contemplated by the invention, a puncture will result in by the invention, a puncture will result in injury to and deflation of but one of the inner-tube sections, for even when all of the inner-tube sections are connected for simultaneous inflation, suitable check valves will preclude the flow of air from an uninjured inner-tube section to a punctured one. When this occurs, it is only necessary to remove the closure in the opening in the rim directly underlying the punctured section to permit of removing the punctured section and the insertion of a new one. It will thus be seen, that the construction is such as to make it unnecessary to carry spare wheels and additional inner-tubes, since only additional inner-tube sections need be carried for the repair of all punctures of ordinary size. Furthermore, the repair of a punctured tire does not involve removal of the shoe to make the repair and application thereof to the rim after the repair has been made which operations are both difficult and time consuming.

I have illustrated the preferred embodiment of my invention in the accompanying drawing, in which—

Figure 2:
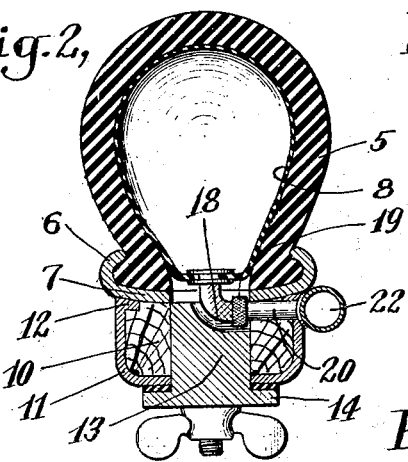
Figure 3:
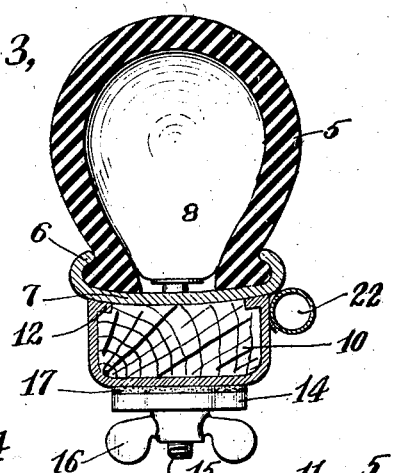
Figure 4:
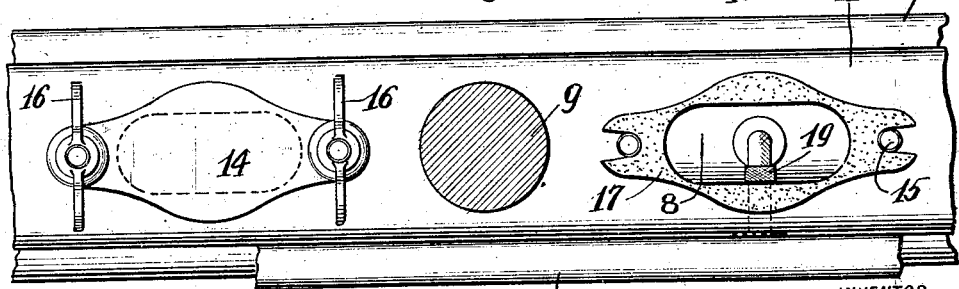

Figure 1 is a side view of a tire constructed in accordance with the invention, this being broken away in part to show the interior construction, Fig. 2 is a cross-section through one of the detachable closures, Fig. 3 is a view similar to Fig. 2, the section being at a point beyond the end of the closure, and Fig. 4 is a view of the inner side of the rim showing one closure in position and the opening for a second closure, the latter being removed.

Referring to these drawings, 5 indicates a shoe of any suitable construction, this being shown as provided with flanges at its edges which interlock with flanges 6 of a metallic rim 7 in the usual manner. Within the shoe 5 is an inner-tube consisting of a plurality of separate or disconnected inner-tube sections 8. These inner-tube sections or members may be of any suitable form, but preferably they are so formed as to be pointed at one end and to have a pointed depression at the opposite end so that the several sections will interlock one with another as indicated in Fig. 1 and so that the several sections may be conveniently folded when deflated for insertion through the openings of the rim as hereinafter set forth. The inner-tube sections are of a length corresponding to the distance between the spokes 9 of the wheel and the center of each section 8 lies opposite the center of the space between a pair of adjacent spokes as shown.

The felly or rim of the wheel includes, in addition to the metallic rim 7, a wooden rim 10 and this wooden rim is preferably provided with a casing 11 of sheet metal having its edges turned inwardly under the metallic rim 7 as shown at 12. This metallic casing 11 is desirable in further strengthening the structure because of the openings which are provided through the rim for the passage of the inner-tube sections 8.

Between each pair of adjacent spokes 9 an opening is provided through the entire rim, that is, through the parts 11, 10 and 7. These openings are of a size sufficient to permit the insertion of the inner-tube sections through them when such sections are deflated and folded. When the inner-tube sections have been positioned within the shoe, the several openings are closed by means of closures 13 consisting of an exterior plate 14 and a plug secured thereto and adapted to fit snugly in the opening in the rim. The ends of the plates 14 are slotted to receive screws 15 on which are wing nuts 16. When a closure has been positioned in its opening the wing nuts 16 may be tightened up upon the screws 15 so as to hold the closure rigidly in position and if desired lock nuts may be screwed down upon the wing nuts to prevent them from working loose. Preferably a gasket 17 is provided between the inner face of the plate 14 and the casing 11 to prevent dirt from working into the interior of the tire through the openings in the rim.

Each of the inner-tube sections or members 8 has a tube connection 18 by which air may be pumped into the section. If desired the several inner-tube sections may be separately inflated in which case each tube connection 18 would be provided with a check valve 19 to prevent leakage of the air from the section. I prefer, however, to so connect the tubes 18 of all of the sections 8 as to permit of inflating all of the inner-tube sections simultaneously. For this purpose, I provide a small tube 22 running entirely around the wheel and secured to the side of the rim. This tube 22 has a plurality of short tubular members 20 extending therefrom through the wall of the rim and into the openings for the closures 13. In this case the members 19 on the ends of the tubular connections 18 of the sections 8 are combined check valves and detachable couplings so that any inner-tube section 8 may be readily connected to and disconnected from the corresponding branch 20 of the tube 22. A valve 21 is provided upon the tube 22 for the connection of a pump thereto in the usual manner. The inner faces of the plugs 13 are preferably provided with depressions in which the tubular connections 18 of the sections 8 lie when those sections are in position within the shoe. Such a depression is shown in Fig. 2.

With the parts thus constructed, the shoe 5 is mounted upon the rim 7 and interlocked with the flanges 6, and it remains in this position throughout its period of usefulness. If the tire becomes punctured, such puncture will not result in deflation of the whole tire but only of that inner-tube section which has become injured for the air in the other sections will not flow through the tube 22 from the uninjured sections by reason of the check valves 19 in the connections leading from those sections. For the repair of such a puncture, it is only necessary to withdraw the injured section 8 and insert a new one in its place. To do this the nuts 16 are loosened and the plug or closure 13 underlying the injured section is withdrawn, thus providing an opening through which the injured section may be passed. A new section in collapsed and folded form is then passed through the opening to the interior of the shoe and its tubular connection 18 is connected to the extension 20 of tube 22 by means of the coupling 19. This having been done, the plug 13 is restored to its initial position and the newly inserted section 8 is inflated by pumping air into the tube 22.

Having described my invention, what I claim as new therein and desire to secure by Letters Patent of the United States is:

1. The combination of a tire, consisting of a shoe, and a plurality of disconnected inflatable inner tube sections therein, and a rim on which the tire is mounted, comprising a metallic member to which the shoe is secured, a wooden member extending circumferentially on the inner side of the metallic member, and a metallic casing for the wooden member, secured at its edges to the metallic member, said rim having a plurality of openings through the various parts thereof, through which said sections may be passed, and detachable closures for said openings, each said closure having a depression on its inner face and a connection for each section for inflating the same extending through said depression and laterally through the wooden member and metallic casing of the rim, substantially as set forth.

2. The combination of a tire consisting of a shoe, a plurality of inner-tube sections therein and connections to the sections for inflating them, and a rim comprising a metallic member to which the shoe is secured and a reinforcing member extending circumferentially on the inner side of the metallic member, said rim having a plurality of inwardly directed openings therethrough, through which said sections may be passed, and detachable closures for said openings, each consisting of a body portion adapted to fit within one of said openings and a plate adapted to lie against and be secured to the inner side of the rim, each said body portion having a depression on its inner face to receive one of said connections, the latter extending laterally through the reinforcing member of the rim, and check valves on the connections, substantially as set forth.

3. The combination of a rim having a plurality of inwardly directed openings therein, a shoe on the rim, a plurality of disconnected, inflatable members in the shoe, each of which may be passed through one of said openings when deflated, a tube secured to one side of said rim, detachable closures for said openings, detachable connections between said members and said tube, extending laterally through said rim, valves in said connections, and a valve connected to said tube, substantially as set forth.

4. The combination of a rim having a plurality of inwardly directed openings therein, a shoe on the rim, a plurality of disconnected, inflatable members in the shoe, each of which may be passed through one of said openings when deflated, a tube secured to one side of said rim, detachable closures adapted to fit within said openings and to be secured to the rim with their inner faces in position to support the inflatable members, said closures having depressions in their inner faces, and detachable connections between said members and said tube, lying in said depressions and extending laterally through said rim, and valves in said connections, substantially as set forth.

This specification signed and witnessed this 25th day of August, 1913.

JAMES A. RABBITT.

Witnesses:
GENJI KURIBARA,
M. OKASAWAR.